June 6, 1950 G. E. MELOY 2,510,898
HYDRAULIC COUPLING BLEED
Filed April 18, 1946 2 Sheets-Sheet 1
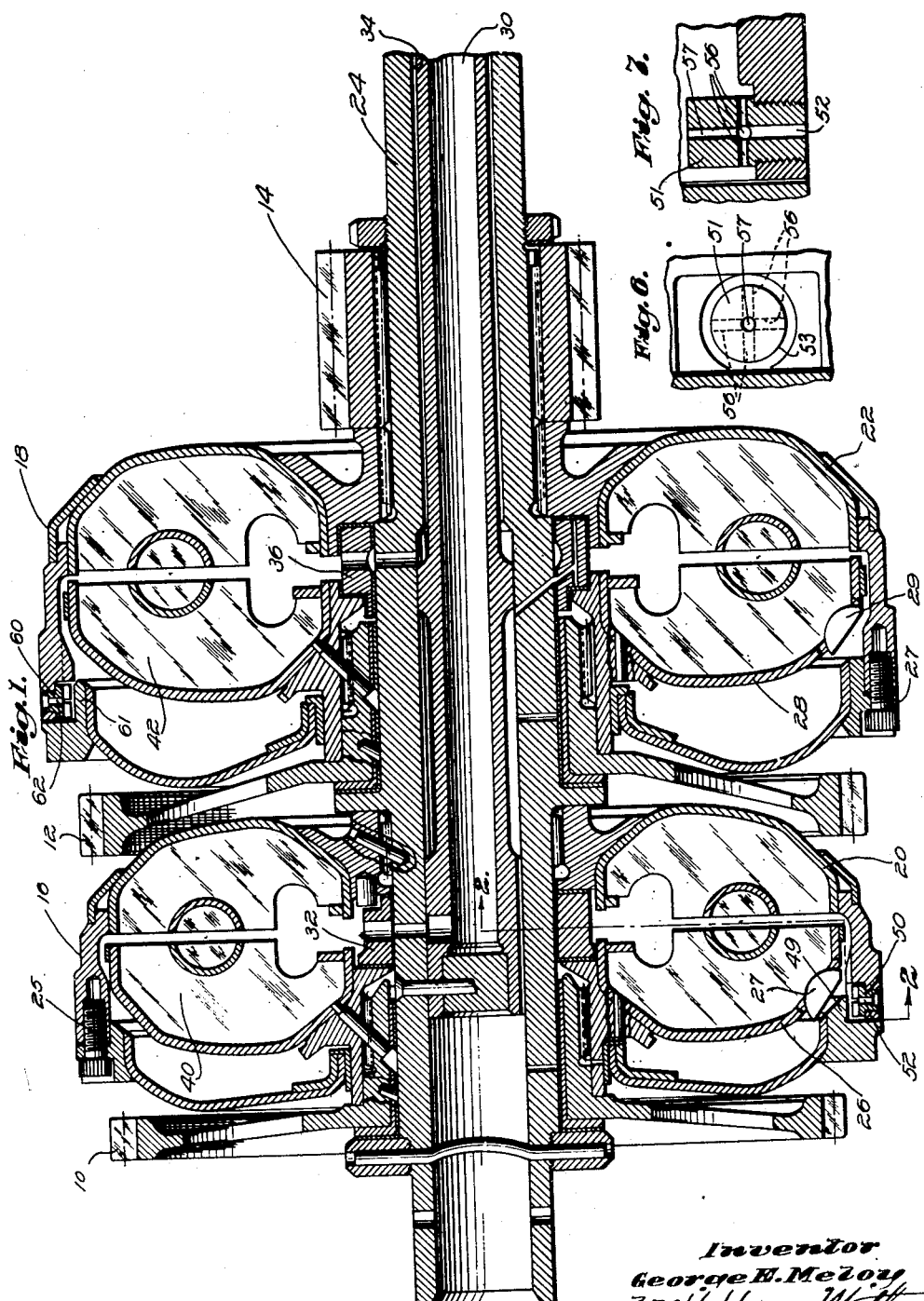
Inventor
George E. Meloy
by H. Hume Mathews
Attorney

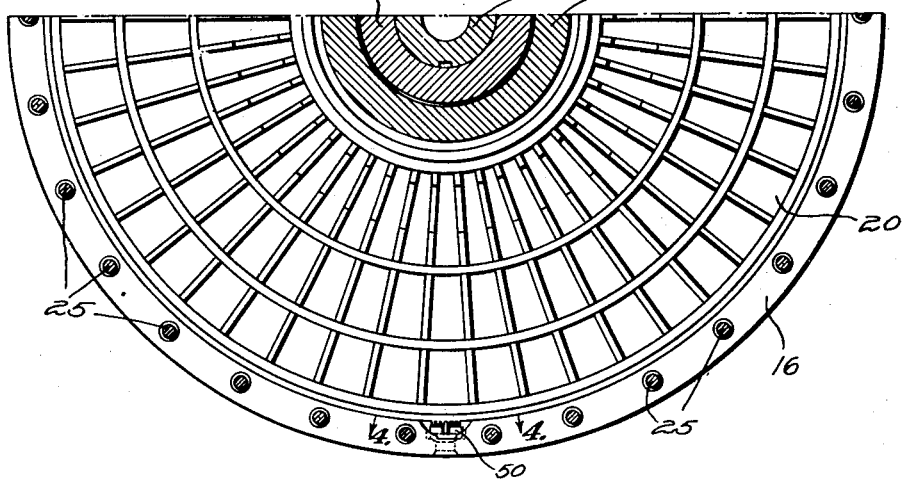
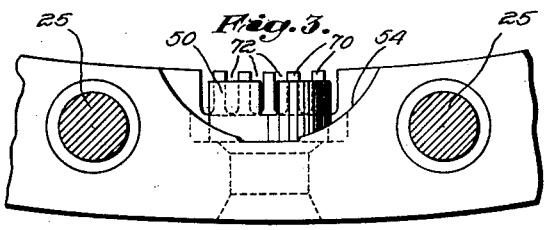
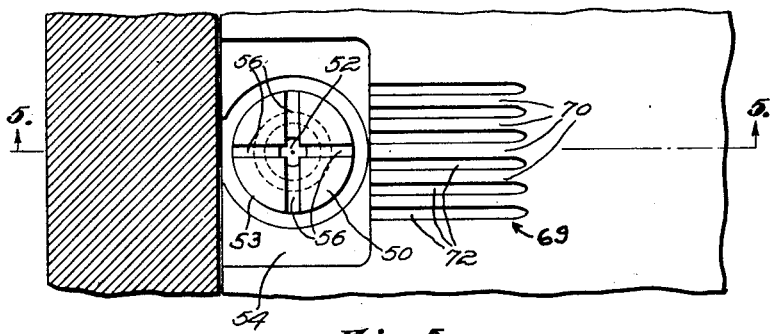
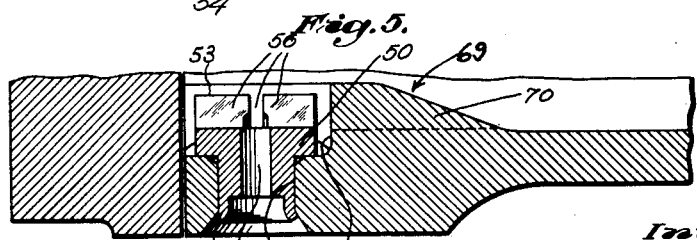

Patented June 6, 1950

2,510,898

UNITED STATES PATENT OFFICE 2,510,898

HYDRAULIC COUPLING BLEED

George E. Meloy, East Hartford, Conn., assignor to United Aircraft Corporation, East Hartford, Conn., a corporation of Delaware Application April 18, 1946, Serial No. 663,207

5 Claims. (Cl. 60—54)

This invention relates to hydraulic couplings.

An object of this invention is to provide non-fouling or non-clogging means for passing a working fluid through the working chamber of a hydraulic coupling.

Another object is to provide improvements in hydraulic coupling bleeds.

A further object is to provide a novel screening means on the upstream side of a hydraulic coupling bleed of predetermined flow capacity for preventing the bleed from becoming clogged with sludge or foreign matter in the coupling working fluid.

A further object is to provide non-clogging bleed means of simple construction for draining fluid from the working chamber of a hydraulic coupling, which may be of the variable filling, controllable slip type.

Other objects and advantages will be apparent from the specification and claims, and from the accompanying drawing which illustrates what is now considered to be a preferred embodiment of the invention.

In the drawing, Fig. 1 is a longitudinal sectional view, with some parts displaced from their true position in order to show details of construction, of a fluid drive assembly which incorporates two hydraulic couplings, fitted with bleed devices constructed according to the teaching of this invention.

Fig. 2 is a view along the line 2—2 of Fig. 1.

Fig. 3 is an enlarged view of the bleed and associated structure shown in Fig. 2.

Fig. 4 is an enlarged view along the line 4—4 of Fig. 2, and including a portion of the rim of an adjacent coupling part.

Fig. 5 is a view along the line 5—5 of Fig. 4.

Figs. 6 and 7 are respectively top and longitudinal sectional views of a modified form of the invention.

Stoppage of the flow of working fluid through a hydraulic coupling, resulting from fouling or clogging of the bleed or flow metering orifice, may cause considerable damage to the coupling, for instance by overheating of the working fluid upon cessation of flow thereof. In aircraft engines, in which hydraulic couplings are now rather widely used, such failures may be very serious, and it is for such applications that this invention was primarily developed.

According to this invention, hydraulic coupling bleeds may be provided which will regulate the flow through the coupling working chamber in the desired manner and yet which will be practically immune from clogging or stoppages, even where the working fluid contains more than the usual amount of foreign matter, such as sludge or chips.

Referring to the drawings, Fig. 1 shows a conventional fluid drive assembly for driving an aircraft engine supercharger in different gear ratios. The supercharger impeller (not shown) is driven either through a low ratio coupling gear 10 or a high ratio coupling gear 12 by the engine driven pinion 14, depending upon which of the two couplings 16 and 18 is engaged.

The couplings comprise impellers 20, 22 and runners 26, 28 which cooperate to form working chambers 40, 42. The impellers 20 and 22 are mounted on and preferably splined to the drive shaft 24 to which pinion 14 is also splined. In operation, pinion 14, which is continuously driven by the engine, may drive the supercharger impeller through low speed gear 10 by filling the working chamber of or the low coupling 16 or through the high speed gear 12 by filling the working chamber of the high coupling 18.

Working fluid, which may be engine lubricating oil, is admitted to the low coupling through passage 30 and ring valve 32 and is admitted to the high coupling through passage 34 and filler ring 36. During operation, fluid is continuously drained from the working chamber 40 or the working chamber 42 through flow metering jets or bleeds 50 and 60, respectively.

These bleeds are of predetermined flow capacity and the rate of flow through the inlets 30, 32 and 34, 36 is controlled in relation to the flow through the respective bleeds or exits so that the filling, and hence the slip, of either coupling may be regulated. For a complete description of one application of the assembly shown in Fig. 1, reference is made to the copending Hobbs and Willgoos application Serial No. 492,423, filed June 26, 1943, now Patent No. 2,400,307, dated May 14, 1946, assigned to applicant's assignee.

Each bleed 50 or 60 comprises a metering jet, or orifice of predetermined size and flow capacity, located preferably on the outer periphery of the respective coupling so that each jet drains fluid from its working chamber at a point subjected to the relatively high pressure created by centrifugal force on the working fluid. In order to prevent stoppage of the flow through the bleeds, they are provided according to this invention with anticlogging means on the upstream side thereof, as specifically described below in connection with the embodiment of the invention represented by the bleed 50, illustrated in Figs. 1 to 5.

Bleed 50 comprises a headed plug member inserted in a bore 58 extending between the inner and outer peripheries of the coupling impeller member 20. The plug head 53 is seated within a recess 54, on the inner side of the impeller wall, and after insertion in bore 58 the plug is riveted in place by swaging or beading the tubular end thereof outwardly, as shown at 59. A drilled cylindrical hole 52 of a selected diameter, extending through the plug forms a flow passage or metering jet of predetermined flow capacity for draining working fluid from the working chamber 40.

In order to prevent fouling of drain passage 52, plug head 53 is provided with two intersecting entrance passages which form four slots, or channels 56, lying along two mutually perpendicular lines in a plane normal to the axis of drain passage 52. Each of these slots is smaller in width than the diameter of drain passage 52 and each slot is preferably of such cross-section that any two of them are of greater flow capacity, or cross-sectional area, than the drain passage and that any one of them is of smaller flow capacity or cross-sectional area, than the drain passage.

As most clearly shown in Figs. 4 and 5, slots 56 extend across or overlay the inlet opening of drain passage 52, so that the fluid must pass through one or more of the slots before it enters the drain passage. Because each of the slots is narrower than the drain passage, any chip, particle, or other foreign matter in any of the working fluid which will pass through the slots 56 will pass freely out of the drain 52, without clogging or restricting the same. The four slots extend radially, in four different directions, from the axis of drain 52, and it is extremely unlikely or almost impossible for all of them to become plugged or fouled with foreign matter at the same time. Consequently, with this construction, one or more of the inlet passages to drain 52 is always open, as well as the drain itself. Further, the slots or channels 56 may be formed with one open side, as shown in Figs. 1 to 5, so that not even one of them can be completely plugged except under very unusual conditions.

As a further precaution against plugging of one or more of slots 56, impeller 20 is provided with a projection or flange 49 extending over the recess 54 in juxtaposition and parallel to the top of head 53, so as to cover the head and open sides of the slots either partially or wholly as respectively shown at 49 and 61 in connection with bleeds 50 and 60 in Fig. 1. With this arrangement, the recess 54 may be either partially or almost wholly closed off or separated from the working chamber 40, except for an inlet thereto provided by a comb or screen 69, provided by spaced teeth or fingers 70 formed in one of the side walls of recess 54. The passages 72 between these teeth or walls are preferably of less width than the diameter of drain passage 52, and they act as a comb or screen for the working fluid passing therethrough from chamber 40 to recess 54. The surfaces of the walls or teeth 70 opposite recess 54 are sloped or tapered to form a relatively smooth or faired surface, interrupted by the screen passages 72, over which the working fluid flows on the inside of the coupling. Thus foreign matter does not tend to collect on the inside, or upstream side, of comb 69. Accumulation of foreign matter at this point may also be further inhibited by providing baffles or mixing vanes 27, fixed to the runner 28 for agitating the working fluid where it passes over the entrance to comb 69.

In the modification of Figs. 6 and 7, the head 51 is extended a considerable distance above slots 56 and the drain passage 52 is continued at 57 (with either the same or a reduced diameter, as desired) beyond the slots to the top of head 51. Thus passage 57 acts as a safety opening which takes working fluid from the coupling at a different level than slots 56; even though the slots become plugged, fluid will continue to flow through the drain 52 by way of passage 57. Slots 56 in Figs. 6 and 7 are in the form of drilled holes which, as in the case of Figs. 1 to 5, are of less width or diameter than the drain passage 50.

The term hydraulic coupling is used herein in a broad sense, to include the various known devices for transmitting power from a driving shaft to a driven shaft through a working fluid which torsionally connects the shafts.

It is to be understood that the invention is not limited to the specific embodiment herein illustrated and described, but may be used in other ways without departure from its spirit as defined by the following claims.

I claim:

1. In a device for preventing the flow of a fluid through an orifice from becoming impeded by an accumulation of foreign matter, an orifice of predetermined flow capacity for controlling the flow of fluid, means located upstream of said orifice and comprising a plurality of fluid passages each having a width less than the diameter of the orifice and any two of said passages having a total flow capacity greater than that of said orifice for admitting said fluid to said orifice, said means being contained in a substantially closed chamber providing an inlet opening, and a series of closely spaced fins adjacent said chamber to provide a screen for said inlet opening.

2. In a hydraulic coupling, a runner member, an impeller member, a headed plug extending through an outer wall of one of said members at the periphery thereof, said plug having a flow metering orifice extending therethrough, the head of the plug having a plurality of slots extending radially from said orifice, said plug head being disposed in a substantially enclosed chamber in the outer wall of the member supporting it, said member having a series of closely spaced fins adjacent said chamber to provide a screened inlet opening.

3. In a hydraulic coupling, a runner member, an impeller member, a headed plug extending through an outer wall of one of said members at the periphery thereof and setting in a recess, said plug having a flow metering orifice extending therethrough, the head of the plug having a plurality of slots extending radially from said orifice, and a circular wall portion on one of said members which extends across said head so as to at least partially cover the open sides of said slots, said wall portion forming with said recess a substantially enclosed chamber.

4. In a hydraulic coupling, a runner member, an impeller member, a headed plug extending through an outer wall of one of said members at the periphery thereof, said plug having a flow metering orifice extending therethrough, the head of the plug having a plurality of slots extending radially from said orifice, and a baffle on the other of said members arranged to pass over the head of the plug for inhibiting the accumulation of foreign matter by the head of the plug.

5. In a hydraulic coupling, a runner member an impeller member, a headed plug extending through an outer wall of one of said members at the periphery thereof, said plug having a flow metering orifice extending therethrough, said plug head being disposed in a substantially enclosed chamber in the outer wall of the member supporting it, said member having a series of closely spaced fins adjacent said chamber to provide a screened inlet opening.

GEORGE E. MELOY.

REFERENCES CITED

The following references are of record in the file of this patent:

UNITED STATES PATENTS

| Number | Name | Date |
| --- | --- | --- |
| 735,074 | Edwards | Aug. 4, 1903 |
| 1,279,287 | Davies | Sept. 17, 1918 |
| 2,059,191 | Altpeter | Nov. 3, 1936 |
| 2,169,359 | Jones et al. | Aug. 15, 1939 |
| 2,194,715 | Nallinger | Mar. 26, 1940 |
| 2,325,090 | Alison | July 27, 1943 |